(12) United States Patent
Shimizu et al.

(10) Patent No.: US 9,464,208 B2
(45) Date of Patent: Oct. 11, 2016

(54) VISCOSITY MODIFIER FOR HIGH CONCENTRATION DISPERSION OF INORGANIC FINE PARTICLES AND HIGH CONCENTRATION DISPERSION OF INORGANIC FINE PARTICLES WHICH CONTAINS THE SAME

(71) Applicant: KUSUMOTO CHEMICALS, LTD., Tokyo (JP)

(72) Inventors: Daisuke Shimizu, Saitama-ken (JP); Junpei Suetou, Saitama-ken (JP); Chihiro Hamazaki, Saitama-ken (JP); Kenichi Asano, Saitama-ken (JP); Hideki Satake, Saitama-ken (JP); Eiichi Sato, Saitama-ken (JP)

(73) Assignee: KUSUMOTO CHEMICALS, LTD., Tokyo (JP)

( * ) Notice: Subject to any disclaimer, the term of this patent is extended or adjusted under 35 U.S.C. 154(b) by 364 days.

(21) Appl. No.: 14/187,697

(22) Filed: Feb. 24, 2014

(65) Prior Publication Data
US 2014/0251178 A1 Sep. 11, 2014

(30) Foreign Application Priority Data

Mar. 8, 2013 (JP) ................. 2013-046812
Dec. 18, 2013 (JP) ................. 2013-261171

(51) Int. Cl.
| C09D 171/02 | (2006.01) |
| C09D 11/03  | (2014.01) |
| C09D 167/02 | (2006.01) |
| C09D 7/00   | (2006.01) |
| C09D 17/00  | (2006.01) |
| C09D 11/102 | (2014.01) |

(52) U.S. Cl.
CPC ............. *C09D 171/02* (2013.01); *C09D 7/002* (2013.01); *C09D 11/03* (2013.01); *C09D 11/102* (2013.01); *C09D 17/002* (2013.01); *C09D 167/02* (2013.01)

(58) Field of Classification Search
CPC .... C09D 171/02; C09D 7/002; C09D 11/03; C09D 11/102; C09D 17/002; C09D 167/02
See application file for complete search history.

(56) References Cited

U.S. PATENT DOCUMENTS

| 2009/0176925 A1 | 7/2009 | Matsunaga et al. |
| 2014/0065385 A1* | 3/2014 | Bruchmann ......... C09D 11/104 428/203 |

FOREIGN PATENT DOCUMENTS

| JP | 59-51951 | 3/1984 |
| JP | 2002-146336 | 5/2002 |

(Continued)

OTHER PUBLICATIONS

Extended European Search Report issued Nov. 20, 2014 in corresponding European Application No. 14156754.5.

*Primary Examiner* — Veronica F Faison
(74) *Attorney, Agent, or Firm* — Wenderoth, Lind & Ponack, L.L.P.

(57) ABSTRACT

This invention provides a viscosity modifier for high concentration dispersion of inorganic fine particles which can reduce, by giving excellent viscosity modifying function to a high concentration dispersion of inorganic fine particles (e.g., printing ink composition, functional paste composition or paint composition, of high concentration dispersion of inorganic fine particles), the occurrence of inconvenience in a printing step or coating step for the manufacture of components or substrates, and also provides a high concentration dispersion of inorganic fine particles which contains said viscosity modifier. This viscosity modifier comprises, as a main component, a reaction product having 2 to 20 phosphate groups or carboxyl groups in molecular structure, which reaction product is produced from a reaction between a polyol having two to six hydroxyl groups and a phosphate group-introducing material or a carboxyl group-introducing material at a molar ratio of hydroxyl group to phosphate group-introducing material or carboxyl group-introducing material of 3:1 to 1:1.

7 Claims, 1 Drawing Sheet

● Acid functional group
○ Inorganic fine particle
∽ Part of viscosity modifier other than acid functional group

(56) References Cited

FOREIGN PATENT DOCUMENTS

| | | |
|---|---|---|
| JP | 2002-194284 | 7/2002 |
| JP | 2003-151351 | 5/2003 |
| WO | 00/39190 | 7/2000 |
| WO | 2004/048484 | 6/2004 |

* cited by examiner

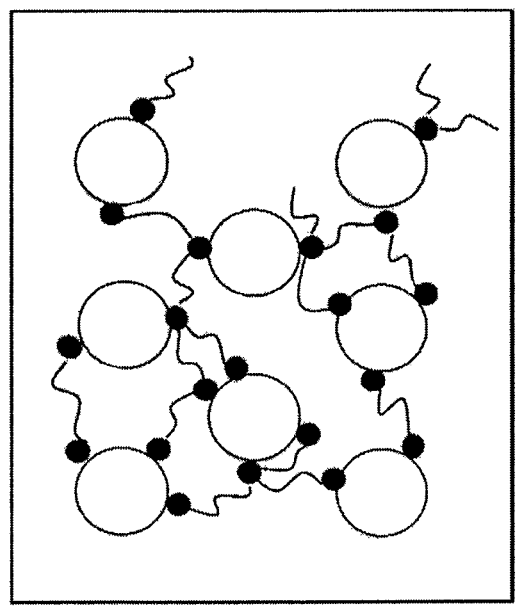
●   Acid functional group
○   Inorganic fine particle
∿   Part of viscosity modifier other than acid functional group

VISCOSITY MODIFIER FOR HIGH CONCENTRATION DISPERSION OF INORGANIC FINE PARTICLES AND HIGH CONCENTRATION DISPERSION OF INORGANIC FINE PARTICLES WHICH CONTAINS THE SAME

TECHNOLOGICAL FIELD

This invention relates to a viscosity modifier for high concentration dispersion of inorganic fine particles (e.g., printing ink composition, functional paste composition or paint composition, of high concentration dispersion of inorganic fine particles) and also to a high concentration dispersion of inorganic fine particles which contains the same. In more detail, this invention relates to a viscosity modifier for high concentration dispersion of inorganic fine particles which is liquid and fluid and is therefore handleable, and which can reduce, when blended with a high concentration dispersion of inorganic fine particles to be printed or applied onto various kinds of components or substrates, the occurrence of deformation or distortion at the edge of print or coating, or the occurrence of inconvenience caused by the insufficient thickness of coating film made by printing or coating, and also to a high concentration dispersion of inorganic fine particles which contains the same.

This invention further relates to a viscosity modifier for paint composition of high concentration dispersion of inorganic fine particles which, when blended with a paint composition of high concentration dispersion of inorganic fine particles, can prevent the precipitation and hard caking of inorganic fine particles without causing the excess increase of viscosity or giving excess thixotropy, or, in particular, when blended with an inorganic zinc rich paint, can prevent the formation of voids in coating film and can provide uniform surface of coating film, thus making it possible to inhibit the generation of bubbles without mist coat, and also to a paint composition of high concentration dispersion of inorganic fine particles which has been prepared with said viscosity modifier.

BACKGROUND ART

Dispersion of inorganic fine particles has been used as printing ink or functional paste which is used in the steps for the manufacture of, for example, capacitor, inductor, electronic circuit, electrode, secondary battery, fuel cell, ceramics and display, in the field of electronic materials, or as a part of starting materials to be blended, in the field of general industrial paint or ink.

When used by the printing method or the application method in the steps for the manufacture of electronic materials, a dispersion of inorganic fine particles makes it possible to precisely control the machining of electronic materials. Hence, dispersion of inorganic fine particles has been industrially utilized as a method to contribute to the high performance and mass production of electronic materials.

In the manufacture of materials by precision machining such as electronic materials, dispersion of fine particles has usually been printed or applied with a printer, a coater or a dispenser. For example, a circuit pattern can easily be formed on a base if circuit is printed with a screen printing method by use of a conductive coating liquid which contains metal fine particles dispersed therein. Furthermore, a protective layer or an insulating layer having a large area can be formed easily by the application, with a coater, of a coating liquid which contains metal oxide particles dispersed therein. When a dispenser is used for the application of a coating liquid which contains metal oxide particles dispersed therein, it becomes possible to apply a small amount accurately.

When a dispersion of fine particles is applied by the printing method or the coating method, the fluidity of the dispersion of fine particles has sometimes caused the deformation or distortion at the edge of print or coating. The fluidity of a dispersion of fine particles has also caused a problem as insufficient thickness of printed film or of coating film.

Due to recent development of manufacturing technology, it has been required to produce the finer or smaller materials in a more efficient manner. As a result, it has been required to have thicker printed film and to increase the precision of the shape at the edge of printed film or coating film, both of which have a large influence on performance.

The aforementioned problems can be solved by enhancing the thixotropy of dispersion of fine particles. The present technology, however, is still insufficient to provide a complete solution because of the occurrence of other problems which are mentioned below. The term thixotropy which is used herein means the property that, when viscosity is measured with a rotational viscometer for example, low viscosity is indicated at a high rotation (high strain rate) and high viscosity is indicated at a low rotation (low strain rate).

Patent Document 1 uses, as a thixotropic agent by which to keep the shape of circuit pattern, fatty amide wax, fumed silica and organic bentonite. When added in a large amount, however, these thixotropic agents may cause clogging in a mesh screen since they are solid particles. Furthermore, fumed silica which is an inorganic substance and organic bentonite are hard to be removed in calcination process.

The thixotropic agent not containing solid particles which is disclosed in Patent Document 2 has a high solvent content. Thus produced dispersion of fine particles has therefore sometimes caused inconveniences due to the solvent of thixotropic agent, such as the mixing of other solvents or the decrease of content of fine particles.

On the other hand, zinc rich paint which is an industrial paint is a high concentration dispersion of zinc powders. In order to prevent the precipitation of zinc powders, zinc rich paint contains a conventional viscosity modifier such as fatty amide wax, fumed silica and organic bentonite. However, said conventional rheology modifier often causes excess increase in viscosity when imparting high thixotropy which is necessary in order to prevent precipitation sufficiently.

Coating film made from inorganic zinc rich paint has usually a large number of voids. On this account, when a base coat film or a top coat film is formed on the same, air in the voids causes defects in coating film such as bubbling and pin hole. To prevent these defects, there has heretofore been made, before said base coat film is applied, a so-called "mist coat step" which comprises applying a low viscosity liquid which has been prepared by diluting the base coat paint with a large amount of solvent, with a view to expelling air from the voids of the coating film of inorganic zinc rich paint. The above-mentioned mist coat does not, however, overcome the above-mentioned defects completely. Also from the viewpoint of workload reduction, it has been required to inhibit the occurrence of bubbling without a mist coat step (Patent Document 3).

Patent Document 4 discloses an inorganic zinc paint composition which comprises a silicate vehicle, zinc powder and a flake pigment. When a coating film is formed by using this paint composition, the flake pigment is distributed selectively in the surface layer of the coating film. As a result, solvent cannot reach the voids and replace air in the voids, and, thus, the formation of bubble or pinhole in the coating film can be prevented.

In the case of application on a vertical face, however, bubbles may be formed in the top coating film since it is difficult in the above-mentioned method for the flake pigment to be distributed selectively in the surface layer of the coating film. In the case of spray application, there has been a problem that alles tip, filter or strainer in the spray coater is clogged with flake pigment.

CITATION LIST

Patent Literature

[Patent Document 1]
Japanese Patent Application KOKAI Publication No. 2003-151351
[Patent Document 2]
Japanese Patent Application KOKAI Publication No. 2002-146336
[Patent Document 3]
Japanese Patent Application KOKAI Publication No. 2002-194284
[Patent Document 4]
Japanese Patent Application KOKAI Publication No. Sho 59-51951

SUMMARY OF INVENTION

Technical Problem

The purpose of this invention is to provide a viscosity modifier for high concentration dispersion of inorganic fine particles (hereinafter sometimes referred to as viscosity modifier) which is liquid and fluid and is therefore handleable, and can reduce by giving excellent viscosity modifying function, when blended with a high concentration dispersion of inorganic fine particles to be printed or applied onto various kinds of components or substrates, the occurrence of deformation or distortion at the edge of printed film or coating film which has thus been printed or coated in a printing step or coating step for the manufacture of parts, or the occurrence of inconvenience caused by the insufficient thickness of coating film made by printing or coating, and also to a high concentration dispersion of inorganic fine particles which comprises said viscosity modifier (hereinafter sometimes referred to as a high concentration dispersion).

Another purpose of this invention is to provide a viscosity modifier for paint composition of high concentration dispersion of inorganic fine particles which, when blended with a paint composition of high concentration dispersion of inorganic fine particles such as zinc rich paint, can prevent by giving excellent viscosity modifying function the precipitation and hard caking of inorganic fine particles without causing the excess increase of viscosity or giving excess thixotropy, or, in particular, when blended with an inorganic zinc rich paint, can prevent the formation of voids in coating film and can form uniform surface of coating film, thus making it possible to inhibit the occurrence of bubbles without mist coat, and also a paint composition of high concentration dispersion of inorganic fine particles which comprises said viscosity modifier.

Solution to Problem

As a result of assiduous studies, the inventors of this invention have found out that a reaction product having 2 to 20 phosphate groups or carboxyl groups in a molecular structure, which is produced by a reaction between a polyol having two to six hydroxyl groups and a phosphate group-introducing material or a carboxyl group-introducing material at a molar ratio of hydroxyl group to phosphate group-introducing material or carboxyl group-introducing material of 3:1 to 1:1, is useful as a viscosity modifier which has physical bonding force among inorganic fine particles, compatibility with binder and fluidity at normal temperature. The inventors further compounded this viscosity modifier in a high concentration dispersion of inorganic fine particles which comprises inorganic fine particles and binder as essential components (e.g., printing ink composition, functional paste composition or paint composition, of high concentration dispersion of inorganic fine particles) at a proportion of 0.1 to 15% by weight, and have thus achieved the above-mentioned purposes.

The inventors of this invention guess that the action and mechanism of the viscosity modifier of this invention works as follows, although it has not yet been verified.

In thus prepared high concentration dispersion of inorganic fine particles (e.g., printing ink composition, functional paste composition or paint composition, of high concentration dispersion of inorganic fine particles), the part of acid functional group of the viscosity modifier adsorbs onto the surface of inorganic fine particles, and the viscosity modifier structurally causes physical association of inorganic fine particles since it has plural adsorption sites. As a result, an interaction among the physically associated aggregates of inorganic fine particles occurs, and, thus, viscosity modifying function is exhibited (see the attached FIG. 1).

Effects of Invention

The viscosity modifier of this invention, when added to a high concentration dispersion of inorganic fine particles, can reduce the occurrence of deformation or distortion at the edge of printed film or coating film which has thus been printed or coated in a printing step or coating step for the manufacture of parts, or the occurrence of inconvenience caused by the insufficient thickness of coating film made by printing or coating.

Furthermore, the viscosity modifier of this invention, when added to a paint composition of high concentration dispersion of inorganic fine particles, can prevent the precipitation and hard caking of inorganic fine particles without causing the excess increase of viscosity or giving excess thixotropy, or, in particular, when added to an inorganic zinc rich paint, can prevent the formation of voids in coating film and can form uniform surface of coating film, thus making it possible to inhibit the occurrence of bubbles without mist coat.

BRIEF DESCRIPTION OF DRAWINGS

FIG. 1 is a drawing to show the concept of action of the viscosity modifier of this invention.

DESCRIPTION OF EMBODIMENTS

The following is a detailed explanation of the viscosity modifier of this invention, and of a high concentration dispersion of inorganic fine particles which contains the same.

1. Viscosity Modifier

The viscosity modifier of this invention is a reaction product having 2 to 20 phosphate groups or carboxyl groups in molecular structure, which is produced by a reaction between a polyol (e.g., polyhydric alcohol, polyether polyol, and polyester polyol) having two to six hydroxyl groups and a phosphate group-introducing material or a carboxyl group-introducing material at a molar ratio of hydroxyl group to phosphate group-introducing material or carboxyl group-introducing material of 3:1 to 1:1.

Phosphate group-introducing material in this invention means a material which, when reacting with other materials, can introduce phosphate group in the molecules of reaction product. Carboxyl group-introducing material means a material which, when reacting with other materials, can introduce carboxyl group in the molecules of reaction product.

The viscosity modifier of this invention is characterized by being able to physically associate with inorganic fine particles, compatibile with binder and being fluid at normal temperature. This viscosity modifier can be easily added to a high concentration dispersion of inorganic fine particles (e.g., printing ink composition, functional paste composition or paint composition, of high concentration dispersion of inorganic fine particles) by an easy method without any particular pretreatment.

When polyhydric alcohol is to be used as polyol having two to six hydroxyl groups, it may be exemplified by ethylene glycol, propylene glycol, 1,3-propane diol, 1,2-butane diol, 1,4-butane diol, 1,5-pentane diol, 1,2-hexane diol, 3-methyl-1,5-pentane diol, 1,6-hexane diol, 1,7-heptane diol, glycerin, polyglycerin, 1,2,4-butanetriol, trimethylol ethane, trimethylol ethane, trimethylol propane, pentaerythritol, sorbitol, etc.

When polyether polyol is to be used as polyol having two to six hydroxyl groups, it may be exemplified by (co)polymer or the like which is produced by the addition reaction of a combination of one, two or more species of the above-mentioned polyhydric alcohols, ethylene oxide, propylene oxide and butylene oxide.

When polyester polyol is to be used as polyol having two to six hydroxyl groups, it may be exemplified by (co)polymer or the like which is produced by the reaction of one, two or more species of the above-mentioned polyhydric alcohols; monobasic or polybasic acid such as succinic acid, maleic acid, glutaric acid, adipic acid, pimelic acid, azelaic acid, sebacic acid, phthalic acid, terephthalic acid, isophthalic acid, 12-hydroxystearic acid, dimethylolpropionic acid, dimethylolbutyric acid, malic acid, tartaric acid and citric acid; and lactones such as ε-caprolactone and δ-valerolactone.

Phosphate group-introducing material is exemplified by phosphoric acid, pyrophosphoric acid, polyphosphoric acid, phosphorus oxychloride, diphosphorus pentaoxide, etc., which are phosphorus compounds which can form phosphoric ester by reacting with polyol.

Carboxyl group-introducing material is exemplified by succinic acid, succinic anhydride, maleic acid, maleic anhydride, phthalic acid, phthalic anhydride, malic acid, tartaric acid, citric acid and isocitric acid, which are a polybasic acid that can react with polyol.

When a polyol having two to six hydroxyl groups is to be made to react with a phosphate group-introducing material or a carboxyl group-introducing material, the ratio of hydroxyl group to phosphate group-introducing material or carboxyl group-introducing material in the reaction should be 3:1 to 1:1 (molar ratio). The product from said reaction has 2 to 20 phosphate groups or carboxyl groups in molecular structure.

The viscosity modifier of this invention may contain organic solvents so that deposition may be inhibited at a low temperature or that the viscosity modifier may be easily added to a high concentration dispersion of inorganic fine particles. Organic solvent to be used may be aliphatic hydrocarbon, alicyclic hydrocarbon, aromatic hydrocarbon, ketone, ester, alcohol, ether, polyglycol, terpene, etc. It is desirable that solvent which is suitable for the system employed is chosen.

Organic solvent is exemplified by methanol, ethanol, normal propyl alcohol, isopropyl alcohol, normal butyl alcohol, isobutyl alcohol, pentyl alcohol, hexyl alcohol, heptyl alcohol, octyl alcohol, 2-ethylhexyl alcohol, ethyleneglycol monomethyl ether, diethyleneglycol monomethyl ether, triethyleneglycol monomethyl ether, ethyleneglycol monoisopropyl ether, diethyleneglycol monoisopropyl ether, triethyleneglycol monoisopropyl ether, ethyleneglycol monobutyl ether, diethyleneglycol monobutyl ether, triethyleneglycol monobutyl ether, propyleneglycol monomethyl ether, dipropyleneglycol monomethyl ether, ethylacetate, normal propylacetate, isopropylacetate, normal butylacetate, isobutylacetate, hexylacetate, ethyleneglycol monomethyl ether acetate, diethyleneglycol monomethyl ether acetate, triethyleneglycol monomethyl ether acetate, ethyleneglycol monoisopropyl ether acetate, diethyleneglycol monoisopropyl ether acetate, triethyleneglycol monoisopropyl ether acetate, ethyleneglycol monobutyl ether acetate, diethyleneglycol monobutyl ether acetate, triethyleneglycol monobutyl ether acetate, propyleneglycol monomethyl ether acetate, dipropyleneglycol monomethyl ether acetate, nonane, normal decane, isodecane, normal dodecane, isododecane, methylcyclohexane, dimethylcyclohexane, ethylcyclohexane, toluene, xylene, terpineol, dihydroterpineol, dihydroterpineol acetate, etc. These may be used singly or in combination.

2. High concentration dispersion of inorganic fine particles (e.g., printing ink composition, functional paste composition or paint composition, of high concentration dispersion of inorganic fine particles):

The high concentration dispersion of inorganic fine particles of this invention comprises inorganic fine particles, binder and viscosity modifier as essential components. These components are desirably chosen according to the purpose of use of the dispersion.

Examples of inorganic fine particles include gold, silver, copper, iron, cobalt, aluminum, nickel, tin, zinc, lead, carbon, tungsten, rare earth metal, alloy of said metals, alumina, silica, zirconia, yttria, ferrite, zinc oxide, titanium oxide, talc, calcium carbonate, barium sulfate, barium titanate, lead zirconate titanate, boron oxide, boron nitride, silicon nitride, tungsten carbide, silicon carbide, etc. These may be used singly or in combination, but need to be chosen according to the purpose of use of the high concentration dispersion.

The content of inorganic fine particles in the high concentration dispersion of inorganic fine particles of this invention is not limited in particular. Preferably, however, the lower limit is 30% by weight, and the upper limit is 95% by weight. When the content of inorganic fine particles is less than 30% by weight, thus obtained high concentration dispersion would have insufficient viscosity, resulting in poor printability or coatability. When the content of inorganic fine particles of a paint composition is less than 30% by weight, thus obtained coating film might give insufficient performance. On the other hand, when the content of inorganic fine particles is more than 95% by weight, thus obtained high concentration dispersion might have too increased viscosity, resulting in poor printing property or application property.

Binder is exemplified by ethylcellulose resin, acrylic resin, poly(vinyl butyral) resin, polyvinyl acetal resin, vinylchloride resin, epoxy resin, polyurethane resin, alkyd resin, polyester resin, melamine resin, silicone resin, silicate resin, phenol resin, etc. These may be used singly or in combination, but need to be chosen according to the purpose of use of the high concentration dispersion.

The content of binder in the printing ink composition or the functional paste of high concentration dispersion of inorganic fine particles of this invention is not limited in particular. Preferably, however, the lower limit is 0.5% by weight, and the upper limit is 30% by weight. When the content of binder is less than 0.5% by weight, thus obtained high concentration dispersion would have too high viscosity, resulting in the decrease of prints. On the other hand, when the content of binder is more than 30% by weight, thus obtained high concentration dispersion might have insufficient viscosity, resulting in poor storage stability or even the precipitation of inorganic fine particles.

The content of binder in the paint composition of high concentration dispersion of inorganic fine particles of this invention is not limited in particular. Preferably, however, the lower limit is 5% by weight, and the upper limit is 60% by weight. When the content of binder is less than 5% by weight, thus obtained paint composition of high concentration dispersion of inorganic fine particles would have poor coatability. On the other hand, when the content of binder is more than 60% by weight, thus obtained paint composition of high concentration dispersion of inorganic fine particles might fail to give good performance of coating film.

The high concentration dispersion of inorganic fine particles of this invention (e.g., printing ink composition, functional paste composition or paint composition, of high concentration dispersion of inorganic fine particles) may comprise not only inorganic fine particles, binder and viscosity modifier, but also organic solvents with which to modify the viscosity of the high concentration dispersion. Said organic solvent is exemplified by methanol, ethanol, normal propyl alcohol, isopropyl alcohol, normal butyl alcohol, isobutyl alcohol, pentyl alcohol, hexyl alcohol, heptyl alcohol, octyl alcohol, 2-ethylhexyl alcohol, benzyl alcohol, ethyleneglycol monomethyl ether, diethyleneglycol monomethyl ether, triethyleneglycol monomethyl ether, ethyleneglycol monoisopropyl ether, diethyleneglycol monoisopropyl ether, triethyleneglycol monoisopropyl ether, ethyleneglycol monobutyl ether, diethyleneglycol monobutyl ether, triethyleneglycol monobutyl ether, propyleneglycol monomethyl ether, dipropyleneglycol monomethyl ether, ethylacetate, normal propylacetate, isopropylacetate, normal butylacetate, isobutylacetate, hexylacetate, ethyleneglycol monomethyl ether acetate, diethyleneglycol monomethyl ether acetate, triethyleneglycol monomethyl ether acetate, ethyleneglycol monoisopropyl ether acetate, diethyleneglycol monoisopropyl ether acetate, triethyleneglycol monoisopropyl ether acetate, ethyleneglycol monobutyl ether acetate, diethyleneglycol monobutyl ether acetate, triethyleneglycol monobutyl ether acetate, propyleneglycol monomethyl ether acetate, dipropyleneglycol monomethyl ether acetate, hexane, nonane, decane, isodecane, dodecane, isododecane, turpentine, naphthenic solvent, isoparaffinic solvent, cyclohexane, methylcyclohexane, dimethylcyclohexane, ethylcyclohexane, alkyl cyclohexane, toluene, xylene, high boiling aromatic solvent, acetone, methylethylketone, methylpentylketone, methylisobutylketone, cyclohexanone, terpineol, dihydroterpineol, dihydroterpineol acetate, etc. These may be used singly or in combination, but the species and amount of organic solvent to be blended are desirably chosen according to the purpose of use of the high concentration dispersion.

The content of organic solvent is not limited in particular, but preferably falls in a range of 0 to 70% by weight based on the weight of the high concentration dispersion of inorganic fine particles (e.g., printing ink composition, functional paste composition or paint composition, of high concentration dispersion of inorganic fine particles). When the content of organic solvent is more than 70% by weight, thus obtained high concentration dispersion of inorganic fine particles might have insufficient viscosity, resulting in poor printability or coatability.

The high concentration dispersion of inorganic fine particles of this invention (e.g., printing ink composition of high concentration dispersion of inorganic fine particles, functional paste composition or paint composition) may comprise not only inorganic fine particles, binder and viscosity modifier, but also a dispersant with which to facilitate the dispersion of inorganic fine particles. Said dispersant is not limited in particular, so long as inorganic fine particles are thereby dispersed in a medium. For this dispersant, there may be employed amine compound such as octylamine, hexylamine and oleylamine; sulfur compound such as dodecane thiol; carboxylic compound such as oleic acid; branched polymer having ammonium group; low molecular or high molecular compound having dithiocarbamate; spheric dendritic polymer called dendrimer; hyperbranched polymer; hyperbranched polymer having ammonium group at the molecular terminal; or dispersants on the market such as phosphoric ester dispersant and polyethyleneimine graft polymer dispersant. These dispersants may be used singly or in combination of two or more species.

The high concentration dispersion of inorganic fine particles of this invention (e.g., printing ink composition, functional paste composition or paint composition, of high concentration dispersion of inorganic fine particles) may further comprise other materials such as surfactant, leveling agent, flame retardant, adhesion improver, coloring agent, antistatic agent, antioxidant, photostabilizer, peeler and coupling agent, as far as the special properties of the dispersion of this invention or the purpose of this invention is not thereby affected.

3. Manufacture of high concentration dispersion of inorganic fine particles (e.g., printing ink composition, functional paste composition or paint composition, of high concentration dispersion of inorganic fine particles):

The high concentration dispersion of inorganic fine particles of this invention can be manufactured by the mixing, kneading and dispersing of inorganic fine particles, binder, viscosity modifier, and optionally other necessary components. The step of kneading can be carried out by a conventional method. Kneading apparatus is exemplified by Henschel Mixer, ribbon mixer, planetary mixer, Nauta mixer, paddle mixer, high speed flow type mixer, dissolver, paint shaker, roll mill, ball mill, attritor, sand mill, beads mill, etc.

The purpose of use of the high concentration dispersion of inorganic fine particles of this invention is not limited in particular. The same can be used conveniently in printing predetermined patterns of wiring, electrode, resistor, capacitor, coil, etc., in the manufacture of electronic materials such as LED backlight, capacitor, inductor, electronic circuit, conductive adhesive, electrode, secondary battery, fuel cell, laminated ceramics capacitor, plasma display panel, VDF panel, inorganic EL, solar battery panel, microstrip antenna, etc., or in coating electronic materials with a view to giving special function to the same.

EXAMPLES

In the following, this invention is explained concretely with working examples, which do not restrict this invention at all. The terms "%" and "parts" in Examples denote "% by weight" and "parts by weight" unless otherwise specified.

Example 1

A 500-mL four neck flask equipped with agitator, temperature adjuster, distributor and nitrogen introduction pipe was filled with 230 parts of propyleneoxide-ethyleneoxide copolymer ("Adeka Pluronic® L-44", a product of ADEKA Corporation having a number average molecular weight of 2200; hydroxyl groups account for 0.2091 mole) and 9.9 parts of diphosphorus pentaoxide (0.0698 mole), which were allowed to react at 120° C. for four hours. Thus obtained reaction product is to be called Viscosity Modifier P-1. In this Example, the molar ratio of hydroxyl group to phosphate group-introducing material is 3:1. Four to five phosphate groups exist in the molecular structure, as inferred from the weight average molecular weight obtained by GPC and from the molar ratio of hydroxyl group to phosphate group-introducing material.

Example 2

A 500-mL four neck flask equipped with agitator, temperature adjuster, distributor and nitrogen introduction pipe was filled with 230 parts of propyleneoxide-ethyleneoxide copolymer ("NEWPOL® PE-71", a product of Sanyo Chemical Industries, Ltd. having a number average molecular weight of 2280; hydroxyl groups account for 0.2018 mole) and 19.0 parts of diphosphorus pentaoxide (0.1338 mole), which were allowed to react at 120° C. for four hours. Thus obtained reaction product is to be called Viscosity Modifier P-2. In this Example, the molar ratio of hydroxyl group to phosphate group-introducing material is 1.5:1. Three to four phosphate groups exist in the molecular structure, as inferred from the weight average molecular weight obtained by GPC and from the molar ratio of hydroxyl group to phosphate group-introducing material.

Example 3

A 500-mL four neck flask equipped with agitator, temperature adjuster, distributor and nitrogen introduction pipe was filled with 230 parts of propyleneoxide-ethyleneoxide copolymer ("NEWPOL® PE-74", a product of Sanyo Chemical Industries, Ltd. having a number average molecular weight of 3420; hydroxyl groups account for 0.1345 mole) and 6.3 parts of diphosphorus pentaoxide (0.0444 mole), which were allowed to react at 120° C. for four hours. Thus obtained reaction product is to be called Viscosity Modifier P-3. In this Example, the molar ratio of hydroxyl group to phosphate group-introducing material is 3:1. Three to four phosphate groups exist in the molecular structure, as inferred from the weight average molecular weight obtained by GPC and from the molar ratio of hydroxyl group to phosphate group-introducing material.

Example 4

A 500-mL four neck flask equipped with agitator, temperature adjuster, distributor and nitrogen introduction pipe was filled with 230 parts of propyleneoxide-ethyleneoxide copolymer ("Adeka Pluronic® L-101", a product of ADEKA Corporation having a number average molecular weight of 3800; hydroxyl groups account for 0.1211 mole) and 8.6 parts of diphosphorus pentaoxide (0.0603 mole), which were allowed to react at 120° C. for four hours. Thus obtained reaction product is to be called Viscosity Modifier P-4. In this Example, the molar ratio of hydroxyl group to phosphate group-introducing material is 1.5:1. Two to three phosphate groups exist in the molecular structure, as inferred from the weight average molecular weight obtained by GPC and from the molar ratio of hydroxyl group to phosphate group-introducing material.

Example 5

A 500-mL four neck flask equipped with agitator, temperature adjuster, distributor and nitrogen introduction pipe was filled with 230 parts of a copolymer of trihydric alcohol, propyleneoxide and ethyleneoxide ("SANNIX® GL-3000", a product of Sanyo Chemical Industries, Ltd., having a number average molecular weight of 3000; hydroxyl groups account for 0.2300 mole) and 10.9 parts of diphosphorus pentaoxide (0.0768 mole), which were allowed to react at 120° C. for four hours. Thus obtained reaction product is to be called Viscosity Modifier P-5. In this Example, the molar ratio of hydroxyl group to phosphate group-introducing material is 3:1. Four to eight phosphate groups exist in the molecular structure, as inferred from the weight average molecular weight obtained by GPC and from the molar ratio of hydroxyl group to phosphate group-introducing material.

Example 6

A 500-mL four neck flask equipped with agitator, temperature adjuster, distributor and nitrogen introduction pipe was filled with 266 parts of a polyester diol which is a reaction product of adipic acid and 3-methyl-1,5-pentanediol ("Kuraray Polyol® P-510", a product of KURARAY CO., LTD. having a number average molecular weight of 500; hydroxyl groups account for 1.0640 mole) and 50.3 parts of diphosphorus pentaoxide (0.3545 mole), which were allowed to react at 120° C. for four hours. Thus obtained reaction product is to be called Viscosity Modifier P-6. In this Example, the molar ratio of hydroxyl group to phosphate group-introducing material is 3:1. Seven to eight phosphate groups exist in the molecular structure, as inferred from the weight average molecular weight obtained by GPC and from the molar ratio of hydroxyl group to phosphate group-introducing material.

Example 7

A 500-mL four neck flask equipped with agitator, temperature adjuster, distributor and nitrogen introduction pipe was filled with 230 parts of a copolymer of trihydric alcohol, propyleneoxide and ethyleneoxide ("SANNIX® GL-3000", a product of Sanyo Chemical Industries, Ltd., having a number average molecular weight of 3000; hydroxyl groups account for 0.2300 mole) and 14.7 parts of citric acid (0.0765 mole), which were allowed to react at 160° C. for two hours. Thus obtained reaction product is to be called Viscosity Modifier P-7. In this Example, the molar ratio of hydroxyl group to carboxyl group-introducing material is 3:1. Fourteen carboxyl groups exist in the molecular structure, as inferred from the weight average molecular weight obtained by GPC and from the molar ratio of hydroxyl group to carboxyl group-introducing material.

Example 8

A 500-mL four neck flask equipped with agitator, temperature adjuster, distributor and nitrogen introduction pipe was filled with 270 parts of a copolymer of tetrahydric alcohol and propyleneoxide ("SANNIX® FA-702", a product of Sanyo Chemical Industries, Ltd., having a number average molecular weight of 6000; hydroxyl groups account for 0.1800 mole) and 8.52 parts of diphosphorus pentaoxide (0.0600 mole), which were allowed to react at 120° C. for four hours. Thus obtained reaction product is to be called Viscosity Modifier P-8. In this Example, the molar ratio of hydroxyl group to phosphate group-introducing material is 3:1. Thirteen phosphate groups exist in the molecular structure, as inferred from the weight average molecular weight obtained by GPC and from the molar ratio of hydroxyl group to phosphate group-introducing material.

Example 9

A 500-mL four neck flask equipped with agitator, temperature adjuster, distributor and nitrogen introduction pipe was filled with 92.1 parts of glycerin (hydroxyl groups account for 3.0000 moles) and 188.8 parts of succinic acid (1.6000 mole), which was allowed to react at 170° C. for five hours. Thus obtained reaction product is to be called Viscosity Modifier P-9. Viscosity Modifier P-9 has low fluidity at normal temperature. To increase fluidity, Viscosity Modifier P-9 may be diluted with epoxy resin (jER807®, manufactured by Mitsubishi Chemical Corporation) to a concentration of 80%. Thus prepared viscosity modifier is to be called Viscosity Modifier P-10. In this Example, the molar ratio of hydroxyl group to carboxyl group-introducing material is 3:1.6. Seventeen carboxyl groups exist in the molecular structure, as inferred from the weight average molecular weight obtained by GPC and from the molar ratio of hydroxyl group to carboxyl group-introducing material.

Comparative Example

For the sake of comparison, powdery fatty amide wax (DISPARLON® 6500, manufactured by Kusumoto Chemicals, Ltd.) (R-1), fatty amide paste (DISPARLON® 6900-20X, manufactured by Kusumoto Chemicals, Ltd.) (R-2), fumed silica (AEROSIL® R972, manufactured by Nippon Aerosil Co., Ltd.) (R-3) and fatty amide paste (DISPARLON® 6900-10X, manufactured by Kusumoto Chemicals, Ltd.) (R-4) which had been put on the market were each used as a thixotropic agent.

Table-1 shows the content of effective components in the viscosity modifiers of this invention and in those of Comparative Example, and also the appearance of the same.

TABLE 1

Effective Components and Appearance of the Viscosity Modifiers of this Invention and of the Comparative Examples

| Viscosity Modifiers or Comparative Examples | Effective components | Appearance |
|---|---|---|
| P-1 | 100% | Viscous liquid |
| P-2 | 100% | Viscous liquid |
| P-3 | 100% | Viscous liquid |
| P-4 | 100% | Viscous liquid |
| P-5 | 100% | Viscous liquid |
| P-6 | 100% | Viscous liquid |
| P-7 | 100% | Viscous liquid |
| P-8 | 100% | Viscous liquid |
| P-9 | 100% | Resinous |
| P-10 | 80% | Viscous liquid |
| R-1 | 100% | Powdery |
| R-2 | 20% | Pasty |
| R-3 | 100% | Powdery |
| R-4 | 10% | Pasty |

As is known from Table-1, all of the viscosity modifiers of this invention are liquid. It would be seen evidently that such a liquid viscosity modifier as these is superior in handling to the powdery one like R-1 or R-3 of the comparative example, and is superior in the concentration of effective components to the pasty one like R-2 or R-4.

Test Example 1

The viscosity modifiers of this invention and the thixotropic agents of the comparative example were subjected to a pyrolytic property test with TG-DTA (DTG-60A manufactured by SHIMADZU CORPORATION) by use of aluminum cell, in nitrogen atmosphere, and at a temperature elevation rate of 10° C./min. In this test, the temperature at which the weight decreased by more than 95% was recorded as pyrolytic temperature. Results of this test are shown in Table-2.

TABLE 2

Pyrolytic property of the viscosity modifiers of this invention and of the comparative examples

| Viscosity Modifiers or Comparative Examples | Pyrolytic Temperature |
|---|---|
| P-1 | 344° C. |
| P-2 | 334° C. |
| P-3 | 366° C. |
| P-4 | 296° C. |
| P-5 | 359° C. |
| P-6 | 550° C. |
| P-7 | 397° C. |
| P-8 | 336° C. |
| P-9 | 439° C. |
| R-1 | 423° C. |
| R-2 | 555° C. |
| R-3 | 600° C. or higher* |

*R-3 does not decompose since it is an inorganic substance.

It is known from the results of Table-2 that most of the viscosity modifiers of this invention have good pyrolytic property and are superior when used for purposes wherein calcination step is necessary.

Test Example 2

Aluminum fine particles (ALE11PB®, manufactured by Kojundo Chemical Laboratory Co., Ltd.), a terpineol solution of ethylcellulose resin (STD-45®, manufactured by The Dow Chemical Company) and a dispersant (HIPLAAD ED 154®, manufactured by Kusumoto Chemicals, Ltd.) were mixed in accordance with the formulation of Table-3, and the resultant mixture was subjected to a roll mill treatment. Subsequently, a viscosity modifier was added, and the resultant mixture was further passed through a roll mill to give a dispersion of aluminum fine particles.

TABLE 3

Formulation of aluminum fine particles dispersion

| | Raw materials | Formulation (parts) |
|---|---|---|
| A | Aluminum fine particles | 70.0 |
| | Ethylcellulose resin | 1.5 |
| | Terpineol | 28.5 |
| | Dispersant | 0.7 |
| B | Viscosity modifier | 0.7 |

The viscosity of the above-mentioned aluminum fine particles dispersion was measured with a 3°×R9.7 mm cone rotor of E-type Viscometer at 25° C. The values of T.I. (thixotropy index) were given by the ratio of viscosity at a shear rate of 0.4 [1/sec] to viscosity at a shear rate of 4 [1/sec] at temperature of 25° C. The viscosity and T.I. value of the aluminum fine particles dispersion are shown by Table-4 below.

TABLE 4

Special properties of aluminum fine particles dispersion

| Viscosity Modifiers or Comparative Examples | Viscosity Pa · s | T.I. value |
|---|---|---|
| Blank | 22.0 | 0.8 |
| P-1 | 41.0 | 3.2 |
| P-2 | 27.1 | 2.1 |
| P-3 | 31.9 | 2.2 |
| P-4 | 28.7 | 1.7 |
| P-5 | 42.6 | 3.9 |
| P-6 | 54.4 | 1.4 |
| P-7 | 29.2 | 1.2 |
| P-8 | 42.8 | 2.0 |
| P-9 | 27.1 | 1.3 |
| R-1 | 51.4 | 2.4 |
| R-3 | 46.0 | 2.4 |

It is clearly known from the results of Table-4 that the viscosity modifiers of this invention exhibit viscosity modifying effects when added to aluminum fine particles dispersion.

Test Example 3

An organic solvent (Terpineol C®, manufactured by Nippon Terpene Chemicals, Inc.) was added to the blend of Test Example 2. The resultant mixture was dispersed by the method as mentioned in Test Example 2, to give aluminum fine particles dispersion.

The viscosity of aluminum fine particles dispersion was measured with a 3°×R14 mm cone rotor of E-type Viscometer at 25° C. Results of measurement are shown by Table-5 below.

TABLE 5

Special properties of aluminum fine particles dispersion

| | Aluminum content 70% | | Aluminum content 50% | | Aluminum content 30% | |
|---|---|---|---|---|---|---|
| | Viscosity Pa · s | T.I. value | Viscosity Pa · s | T.I. value | Viscosity Pa · s | T.I. value |
| No addition | 22.0 | 0.8 | 1.09 | 1.2 | 0.20 | 1.2 |
| P-2 | 27.1 | 2.1 | 1.37 | 1.7 | 0.20 | 2.3 |
| P-3 | 31.9 | 2.2 | 1.31 | 1.8 | 0.24 | 1.6 |
| P-4 | 28.7 | 1.7 | 1.61 | 2.5 | 0.22 | 1.4 |

It is clearly known from the results of Table-5 that viscosity modifying effects are maintained even when an organic solvent was added to the aluminum fine particles dispersion aluminum fine particles dispersion.

Test Example 4

Silver fine particles (AG2-1C®, DOWA Electronics Co., Ltd.) and a terpineol solution of ethylcellulose resin (STD-45®, manufactured by The Dow Chemical Company) were mixed in accordance with the formulation of Table-6, and the resultant mixture was subjected to a roll mill treatment. Subsequently, a viscosity modifier was added, and the resultant mixture was further passed through a roll mill to give a dispersion of silver fine particles.

TABLE 6

Formulation of silver fine particles dispersion

| | Raw materials | Formulation (parts) |
|---|---|---|
| A | Silver fine particles | 80.0 |
| | Ethylcellulose resin | 2.0 |
| | Terpineol | 17.2 |
| B | Viscosity modifier | 0.8 |

The viscosity of the above-mentioned silver fine particles dispersion was measured with a 3°×R9.7 mm cone rotor of E-type Viscometer at 25° C. The viscosity and T.I. values of the silver fine particles dispersion are shown by Table-7 below.

Thin lines were drawn with thus obtained silver fine particles dispersion on a ceramics substrate by screen printing method with a screen of #400 mesh and a line width of 90 μm. Special properties of the silver fine particles dispersion were evaluated by the reproducibility of the line width. Results of evaluation are shown in Table-7.

TABLE 7

Test results of silver fine particles dispersion

| Viscosity Modifiers or Comparative Examples | Viscosity Pa · s | T.I. value | Width of printed line (μm) | State of print |
|---|---|---|---|---|
| No addition | 122.2 | 1.4 | 119 | Blurs at end |
| P-1 | 225.8 | 1.8 | 101 | Good |
| P-3 | 182.5 | 2.0 | 91 | Good |
| P-5 | 245.1 | 1.9 | 97 | Good |
| R-1 | 211.0 | 2.2 | 88 | Mesh marks |
| R-3 | 180.6 | 1.8 | 91 | Mesh marks |

It is clearly known from the results of Table-7 that a silver fine particles dispersion which contains the viscosity modifiers of this invention gives a good state of print.

Test Example 5

Silver fine particles (AG2-1C®, DOWA Electronics Co., Ltd.) and a terpineol solution of acrylic resin (manufactured by Kusumoto Chemicals, Ltd.) were mixed in accordance with the formulation of Table-8, and the resultant mixture was subjected to a roll mill treatment. Subsequently, a viscosity modifier was added, and the resultant mixture was further passed through a roll mill to give a dispersion of silver fine particles.

TABLE 8

Formulation of silver fine particles dispersion

|   | Raw materials | Formulation (parts) |
|---|---|---|
| A | Silver fine particles | 88.0 |
|   | Acrylic resin | 2.2 |
|   | Terpineol | 8.9 |
| B | Viscosity modifier | 0.9 |

The viscosity of the above-mentioned silver fine particles dispersion was measured with a 3°×R9.7 mm cone rotor of E-type Viscometer at 25° C. The viscosity and T.I. values of the silver fine particles dispersion are shown by Table-9 below.

Thin lines were drawn with thus obtained silver fine particles dispersion on a ceramics substrate by screen printing method with a screen of #400 mesh and a line width of 90 μm. Special properties of the silver fine particles dispersion were evaluated by the reproducibility of the line width. Results of evaluation are shown in Table-9.

TABLE 9

Test results of silver fine particles dispersion

| Viscosity Modifiers or Comparative Examples | Viscosity Pa · s | T.I. value | Width of printed line (μm) | State of print |
|---|---|---|---|---|
| No addition | 36.2 | 2.3 | 113 | Decrease in linearity at the end |
| P-1 | 77.5 | 2.3 | 101 | Good |
| P-3 | 84.4 | 2.3 | 89 | Slightly meshy |
| P-5 | 98.3 | 2.4 | 99 | Good |
| R-1 | 148.6 | 4.2 | Print impossible due to excess increase in viscosity | |
| R-3 | 110.2 | 3.0 | 94 | Mesh marks |

It is clearly known from the results of Table-9 that a silver fine particles dispersion which contains the viscosity modifiers of this invention gives a good state of print.

Test Example 6

Fused silica powder (FB-3LDX®, manufactured by Denki Kagaku Kogyo Kabushiki Kaisha), epoxy resin (jER807®, manufactured by Mitsubishi Chemical Corporation) and a viscosity modifier were mixed in accordance with the formulation of Table-10, and the resultant mixture was dispersed with a planetary centrifugal mixer to give a dispersion of fused silica powder.

TABLE 10

Formulation of fused silica powder dispersion

| Raw materials | Formulation (parts) |
|---|---|
| Fused silica powder | 50.0 |
| Epoxy resin | 50.0 |
| Viscosity modifier | 1.0 |

The viscosity of the above-mentioned fused silica powder dispersion was measured with a 3°×R9.7 mm cone rotor of E-type Viscometer at 25° C. The viscosity and T.I. values of the fused silica powder dispersion are shown by Table-11 below.

TABLE 11

Special properties of fused silica powder dispersion

| Viscosity Modifiers or Comparative Examples | Viscosity Pa · s | T.I. value |
|---|---|---|
| Blank | 19.7 | 1.0 |
| P-1 | 24.7 | 2.1 |
| P-2 | 26.9 | 2.6 |
| P-3 | 25.5 | 2.5 |
| P-4 | 26.0 | 2.5 |
| P-5 | 26.1 | 2.3 |
| P-6 | 28.6 | 1.0 |
| P-7 | 31.5 | 2.5 |
| P-8 | 22.8 | 3.9 |
| P-10 | 44.3 | 4.1 |
| R-1 | 23.1 | 1.1 |
| R-3 | 22.9 | 0.9 |

It is clearly known from the results of Table-11 that the viscosity modifiers of this invention exhibit viscosity modifying effects when added to fused silica powder dispersion.

Test Example 7

A predetermined amount of viscosity modifier was added to ethyl silicate resin (HAS-1®, manufactured by COLCOAT CO., Ltd.) in accordance with the formulation of Table-12, and the resultant mixture was dispersed with a dissolver. Subsequently, zinc powder (zinc powder #3, manufactured by Sakai Chemical Industry Co., Ltd.) was mixed, and the resultant mixture was dispersed with a dissolver to give an inorganic zinc rich paint.

TABLE 12

Formulation of inorganic zinc rich paint

| | Raw materials | Formulation (parts) |
|---|---|---|
| A | Ethyl silicate resin | 25.0 |
| | Viscosity modifier | X |
| B | Zinc powder | 75.0 |

The viscosity of the above-mentioned inorganic zinc rich paint was measured with a rheometer at 25° C. The values of T.I. (thixotropy index) were given by the ratio of viscosity at a shear rate of 0.1 [1/sec] to viscosity at a shear rate of 1 [1/sec] at temperature of 25° C. The viscosity and T.I. value of the inorganic zinc rich paint are shown by Table-13 below.

The above-mentioned inorganic zinc rich paint was further subjected to a precipitation test in a sealed test bottle. In detail, the paint was left to stand still at room temperature for a day, and, after that, the sedimentation volume of zinc powder (the percentage of the volume of sediment of zinc powder to the total volume of paint) was measured. Furthermore, the hardness of zinc powder sediment was tested by the sensory analysis of metal bar invasion resistance, and the obtained results were evaluated according to the five-grade evaluation system from Grade 1 (very hard) to Grade 5 (soft). The sedimentation volume and the sedimentation hardness of inorganic zinc rich paint are shown in Table-13 below.

TABLE 13

Test results of inorganic zinc rich paint (1)

| Viscosity Modifiers or Comparative Examples | Amount added per resin (%) | Viscosity/ 1[1/sec] (mPa · s) | T.I. value | Sedimentation volume (%) | Sedimentation hardness |
|---|---|---|---|---|---|
| No addition | — | 15.5 | 1.8 | 45.2 | 1 |
| P-2 | 1 | 25.3 | 2.7 | 55.1 | 5 |
| R-4 | 5 | 98.7 | 10.6 | 74.1 | 4 |

It is seen from the results of Table-13 that, when added to an inorganic zinc rich paint, the viscosity modifier of this invention prevents the sedimentation of inorganic fine particles and thus exhibits good effects of preventing hard caking without causing the excess increase of viscosity or giving excess thixotropy, as compared with conventional thixotropic agent of comparative example.

For the sake of measurement of roughness and porosity of coating film surface, the above-mentioned inorganic zinc rich paint was applied on a glass plate with a 250 μm-applicator. Thus coated plate was dried at room temperature (20° C.) for seven days, and, then, the coating film surface was observed with a laser microscope. Surface roughness (Ra: arithmetic average roughness; Ry: maximum height) was obtained from an average of five measurement points with no filter processing, on the basis of JIS B 0601. Moreover, 3D observation of the unevenness of coating film surface was made with a laser microscope, and, then, the porosity of coating film surface was evaluated with visual observation according to the five-grade evaluation system from Grade 1 (highly porous) to Grade 5 (no pores at all). Ra, Ry and the porosity of coating film surface of inorganic zinc rich paint are shown in Table-15.

Epoxy paint of Table-14 was applied on coating film of the above-mentioned inorganic zinc rich paint with a 250 μm-applicator, and was then dried at room temperature for one day. The state of foam and pin holes which had been generated on the epoxy coating film of thus obtained test plate was evaluated according to the five-grade evaluation system from Grade 1 (remarkable foaming) to Grade 5 (no foaming). The result of evaluation is shown in Table-15.

TABLE 14

Formulation of epoxy paint

| | Raw material | Supplier | Amount (part) |
|---|---|---|---|
| Part A | jER1001 × 75 | Mitsubishi Chemical Corporation | 53.3 |
| | Xylene | | 11.0 |
| | Methyl isobutyl ketone | | 5.5 |
| | Tipaque R-820 | Ishihara Sangyo Kaisha, Ltd. | 28.0 |
| | DISPARLON 6900-20X | Kusumoto Chemicals, Ltd. | 2.0 |
| Part B | Versamid 115 × 70 | Cognis Japan Ltd. | 21.3 |

TABLE 15

Test results of inorganic zinc rich paint (2)

| Viscosity Modifiers or Comparative Examples | Amount added per resin (%) | Ra (μm) | Ry (μm) | Porosity of coating film surface | State of foaming of top coating |
|---|---|---|---|---|---|
| No addition | — | 1.45 | 10.99 | 4 | 5 |
| P-2 | 1 | 1.03 | 9.29 | 5 | 5 |
| R-4 | 5 | 4.12 | 28.48 | 1 | 1 |

It is seen clearly from the results of Table-15 that, when added to an inorganic zinc rich paint, the viscosity modifiers of this invention prevent the formation of voids in coating film and inhibit the occurrence of foaming without mist coat, as compared with conventional thixotropic agent of comparative example.

INDUSTRIAL APPLICABILITY

The viscosity modifier of this invention is expected to contribute to the improvement in high performance and mass production of electronic materials when predetermined patterns of wiring, electrode, resistor, capacitor, coil, etc., are to be printed with ink or functional paste in the manufacture of electronic materials (e.g., LED backlight, capacitor, inductor, electronic circuit, conductive adhesive, electrode, secondary battery, fuel cell, laminated ceramics capacitor, plasma display panel, VDF panel, inorganic EL, solar battery panel, microstrip antenna, etc.), or when electronic materials are to be coated with paint so that special function may be given to the same.

Also in the field of paint or ink which comprises a dispersion of pigment paste or inorganic fine particles, the viscosity modifier of this invention is expected to contribute to the prevention of the precipitation of pigment or inorganic fine particles, or to the improvement of performance of coating film or print film.

The invention claimed is:

1. A viscosity modifier for high concentration dispersion of inorganic fine particles which comprises a reaction product having 2 to 20 phosphate groups in molecular structure, which reaction product is produced from a reaction between a polyol having two to six hydroxyl groups and a phosphate group-introducing material selected from the group consisting of phosphoric acid, pyrophosphoric acid, polyphosphoric acid, phosphorus oxychloride and diphosphorus pentaoxide at a molar ratio of hydroxyl group to phosphate group-introducing material of 3:1 to 1:1.

2. The viscosity modifier of claim 1 wherein the high concentration dispersion of inorganic fine particles is a printing ink composition.

3. The viscosity modifier of claim 1 wherein the high concentration dispersion of inorganic fine particles is a functional paste composition.

4. The viscosity modifier of claim 1 wherein the high concentration dispersion of inorganic fine particles is a paint composition.

5. A printing ink composition which comprises inorganic fine particles, binder and the viscosity modifier of claim 1.

6. A functional paste composition which comprises inorganic fine particles, binder and the viscosity modifier of claim 1.

7. A paint composition which comprises inorganic fine particles, binder and the viscosity modifier of claim 1.

* * * * *